United States Patent
Dupcinov et al.

(10) Patent No.: US 7,831,206 B2
(45) Date of Patent: Nov. 9, 2010

(54) METHOD AND APPARATUS FOR USE IN AN AD-HOC WLAN SYSTEM

(75) Inventors: Marina Dupcinov, Dublin (IE); Srdjan Krco, Dublin (IE); Markus Jakob, Löffelsterz (DE)

(73) Assignee: Telefonaktiebolaget LM Ericsson (publ), Stockkolm (SE)

( * ) Notice: Subject to any disclaimer, the term of this patent is extended or adjusted under 35 U.S.C. 154(b) by 892 days.

(21) Appl. No.: 10/528,776

(22) PCT Filed: Oct. 30, 2002

(86) PCT No.: PCT/SE02/01977

§ 371 (c)(1),
(2), (4) Date: Aug. 19, 2005

(87) PCT Pub. No.: WO2004/040863

PCT Pub. Date: May 13, 2004

(65) Prior Publication Data

US 2006/0205424 A1    Sep. 14, 2006

(51) Int. Cl.
    *H04B 7/00*    (2006.01)
(52) U.S. Cl. .................. 455/41.2; 455/507; 455/513
(58) Field of Classification Search ........... 455/41.2, 455/507, 513
    See application file for complete search history.

(56) References Cited

U.S. PATENT DOCUMENTS 5,007,052 A * 4/1991 Flammer ............... 370/389
5,987,011 A * 11/1999 Toh ....................... 370/331
6,934,554 B2 * 8/2005 Mizuno et al. ............ 455/502
7,180,875 B1 * 2/2007 Neumiller et al. .......... 370/329

(Continued)

FOREIGN PATENT DOCUMENTS

JP    9-284841    10/1997

(Continued)

OTHER PUBLICATIONS

Dube et al., Signal Stability-Based Adaptive Routing (SSA) for Ad Hoc Mobile Networks, IEEE Personal Communications, Feb. 1997, pp. 36-45.

(Continued)

*Primary Examiner*—Nay A Maung
*Assistant Examiner*—Richard Chan
(74) *Attorney, Agent, or Firm*—Nixon & Vanderhye P.C.

(57) ABSTRACT

The invention refers to a method for use by a first node in an ad-hoc WLAN, which first node maintains a table of other nodes within the network which can be used for forwarding messages. The method comprises the step of letting the first node receive a first signal from a second node, and additionally comprises the steps of: -letting the first node analyse the signal received from the second signal, -if the second node is already present in the table maintained by the first node, the signal strength is compared to a first predetermined comparison level, -if the second node is not present in the table, its signal strength is compared to a second predetermined comparison level, -if the signal strength from the second node exceeds the relevant comparison level, the first node decides that the second node may be used in the table.

4 Claims, 2 Drawing Sheets

U.S. PATENT DOCUMENTS

| | | | |
|---|---|---|---|
| 7,184,421 B1* | 2/2007 | Liu et al. | 370/338 |
| 2001/0024953 A1* | 9/2001 | Balogh | 455/432 |
| 2002/0061001 A1 | 5/2002 | Garcia-Luna-Aceves et al. | |
| 2002/0071395 A1 | 6/2002 | Redi et al. | |
| 2003/0137966 A1* | 7/2003 | Odman et al. | 370/347 |
| 2003/0165117 A1* | 9/2003 | Garcia-Luna-Aceves et al. | 370/238 |
| 2003/0203742 A1* | 10/2003 | D'Souza et al. | 455/522 |
| 2004/0063458 A1* | 4/2004 | Hori et al. | 455/554.2 |
| 2004/0203762 A1* | 10/2004 | Liu et al. | 455/434 |

FOREIGN PATENT DOCUMENTS

| | | |
|---|---|---|
| JP | 11-239176 | 8/1999 |
| JP | 11-252114 | 9/1999 |
| JP | 2001-189971 | 7/2001 |
| WO | 01030035 A3 | 4/2001 |
| WO | 02073354 A2 | 9/2002 |
| WO | 02078229 A1 | 10/2002 |

OTHER PUBLICATIONS

Official Action issued in corresponding Japanese Application No. 2004-548199 dated Dec. 14, 2007.

Letter from Ohtsuka Patent Office dated Jan. 17, 2008 containing English translation of Official Action issued in corresponding Japanese Application No. 2004-548199 dated Dec. 14, 2007.

* cited by examiner

METHOD AND APPARATUS FOR USE IN AN AD-HOC WLAN SYSTEM

This application is the US national phase of international application PCT/SE2002/00197 filed 30 Oct. 2002, which designated the U.S. The entire contents of this application is incorporated herein by reference.

TECHNICAL FIELD

The present invention relates to a method for use by a first node in an ad-hoc Wireless Local Area Network (WLAN) which first node maintains a table of other nodes within the network which can be used for forwarding messages within the network. By means of the invention, a more reliable and efficient communication within an ad-hoc system can be obtained.

BACKGROUND

So called ad-hoc networks within Wireless Local Area Network (WLAN) systems are infrastructure-less networks. Nodes (e.g. subscribers or users) in an ad-hoc network are usually mobile, have a short-range wireless access and can join and leave the network at any time. Due to a limited range of applied wireless technologies, multiple hops are usually needed for communication.

Since there is no infrastructure within the system, the nodes themselves have to forward packets for other nodes, and hence have to act as both hosts and routers. In an ad-hoc network, the nodes are also responsible for network configuration and maintenance. Several routing protocols have been proposed for this kind of environment, usually modifications of the existing routing protocols for fixed networks. Examples of the most advanced ones are AODV (Ad hoc On Demand Distance Vector) and DSR (Dynamic Source Routing).

The AODV specification suggests either link layer information or usage of certain messages, for example the so called HELLO message, for neighbourhood detection. Since not all kinds of hardware provides support for adequate link layer notifications, such messages are used in many implementations. The specification defines that whenever a node A receives such a message from node B, node A includes node B into the routing table, and can eventually use node B for route establishment. If node A does not receive a certain number of consecutive HELLO messages from node B (each node broadcasts HELLO message periodically), it removes node B from the routing table.

There is a possibility that node A will receive HELLO messages from node B without node B receiving user packets from node A. This is due to the fact that certain kinds of hardware treat broadcast and unicast packets differently, and hence the range of respective packets is different. This causes a major problem for AODV performance, since neighbouring nodes can be falsely detected and routes established although it is not possible to send packets over them.

Another problem is that even when it is possible to send user packets to the neighbouring node, the quality of the link between the neighbours can be very poor and will cause errors, retransmissions, lower throughput and eventually route breakage. In this case, it would be better to establish a multi-hop route with high quality links than a 1-hop route with a low quality link.

SUMMARY

As has become evident from the initial description, there is a need for a node in an ad-hoc network in a WLAN-system to be able to establish and maintain reliable communication paths via other nodes in the ad-hoc system.

A first node in an ad-hoc Wireless Local Area Network (WLAN) which first node maintains a table of other nodes within the network which can be used for forwarding messages within the network. The first node receives a first signal from a second node and analyze the signal received from the second signal. If the second node is already present in the table maintained by the first node, the signal strength is compared to a first predetermined comparison level, and if the second node is not present in the table, its signal strength is compared to a second predetermined comparison level. If the signal strength from the second node exceeds the relevant comparison level, the first node decides that the second node may be used in the table. Thus, ad-hoc communications in an WLAN system can be established and maintained in a more reliable way than has been possible with previously known technology.

If the second node is already present in the table maintained by the first node, the signal strength is compared to a first predetermined comparison level, and if the second node is not present in the table, its signal strength is compared to a second predetermined comparison level.

If the signal strength from the second node exceeds the relevant comparison level, the first node decides that the second node may be used in the table.

Thus, by means of the method according to the present invention, an ad-hoc system in an WLAN system can be established and maintained in a more reliable way than has been possible with previously known technology.

DETAILED DESCRIPTION

Figure 1:
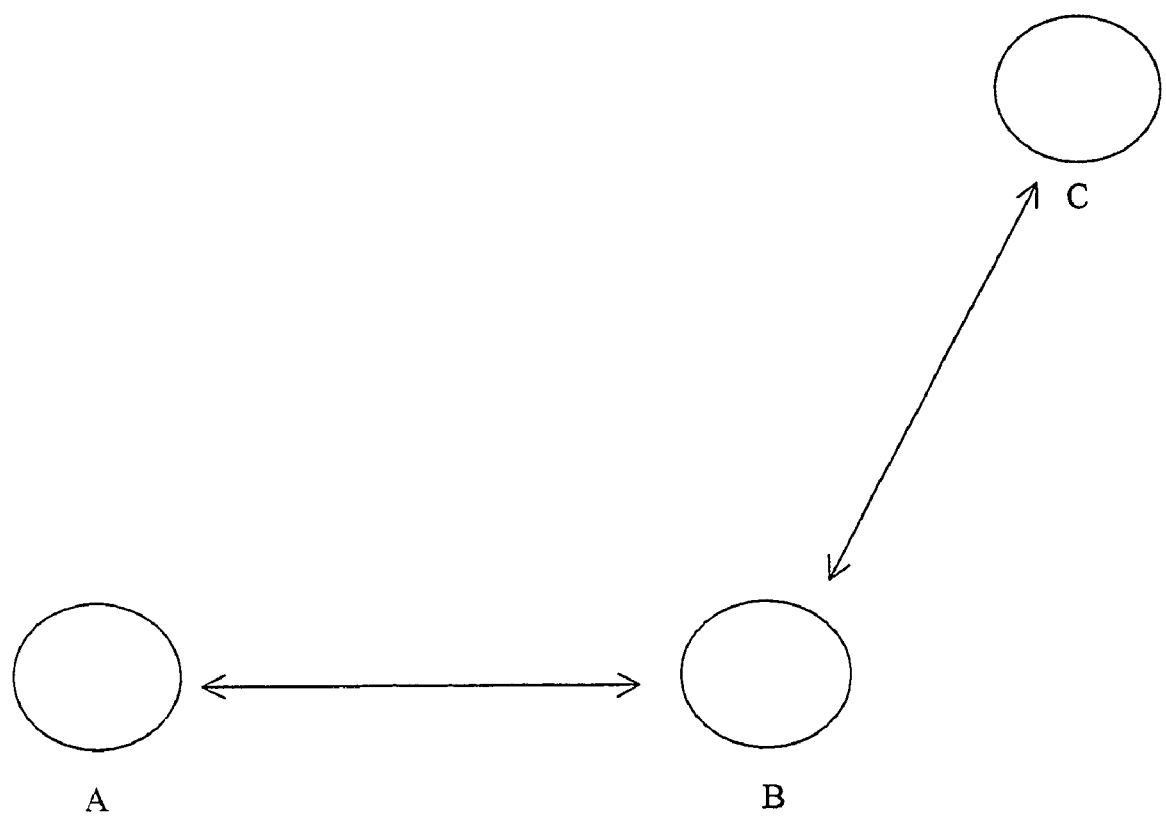
FIG. 1 schematically shows an ad-hoc WLAN-system.

FIG. 1 schematically shows an ad-hoc network in a WLAN-system. The WLAN-system can, for example, be established within the framework of one of the various so called 802.11 systems, or can alternatively be established using another WLAN technology. As can be seen from the drawing, the system comprises three nodes, referred to as A, B and C, but the exact number of node can of course vary.

The term "ad-hoc" refers to the fact that the network does not contain any fixed infrastructure such as Access Points which serve to direct and route traffic within the system. Instead, the individual nodes forward packets for other nodes, and thus each individual node has to have the ability to act both as a server and as a router.

Node A, for example, in its capacity as server and/or router maintains a list of neighbouring nodes which can assist node A in routing messages. Nodes are added or maintained on this list on the basis of messages which are received form these nodes. Route establishment is based on broadcasting and re-broadcasting route requests, and waiting for route replies from either the destination node or some intermediate node that already has the route to the destination. Route reply is unicast back to the source node.

The term "unicast" here refers to a message sent from a first node, intended for a second "addressee" node, whereas the term "broadcast" refers to a message sent form a first node, intended for more than one "addressee" node.

The messages on the basis of which nodes are added to or kept on the list maintained by node A can be one or more specific messages, chosen more or less arbitrarily, or a message used specifically for this purpose. An example of a message which may be used in the AODV (Ad hoc On Demand Vector) protocol is the so called HELLO message, which is broadcast by every node periodically.

In current AODV systems, whenever a node A receives a HELLO message from node B, node A includes the node B into the routing table, and can eventually use node B for route establishment. If node A does not receive two consecutive HELLO messages from node B (each node broadcast HELLO message periodically), it removes node B from the routing table.

The fact that some messages are broadcast and others are unicast may cause problems, since certain kinds of hardware and/or software treat broadcast messages differently than unicast messages. Broadcast messages may have a longer range than unicast messages, which will lead to neighbouring nodes being falsely detected as nodes which may be used for routing, although in actual fact it is not possible to send messages or data packets via these nodes.

Additionally, even if a node whose broadcast message has been detected is possible to use for routing, the quality of the link between node A and this mode can be very poor, leading to a multitude of problems. In such a case, it might be better to establish a route with more nodes in it than to take "a shortcut" via a node which will give poor transmission quality.

With renewed reference to FIG. 1, the following is a scenario which might occur: A two-hop route is established between nodes A and C via node B. When node C comes closer to node B, node A might receives some of the HELLO messages from node C. When node A receives a HELLO message from node C it will regard node C as a neighbour, and will try to send user packets directly to it, rather than via node B. However, since the Signal to Noise Ration (SNR) of the signals between nodes A and C is low, errors are likely to occur on the link, and throughput will be low. Hence, it would be better to use the 2-hop route (A-B-C) with good quality links instead of the 1-hop (A-C) route with poor quality link.

Oscillations between "is a neighbour" and "is not a neighbour" are possible as well. If, after receiving one HELLO message from node C, node A does not receive another HELLO message from node C, node A will remove node C from the routing table, and a route reestablishment procedure will be invoked, causing delays and throughput decrease. After that, another HELLO message could come through and node C would become a neighbour again.

The problems described above, i.e. problems caused by a difference in range between different kinds of messages are addressed as will be described with reference to the example; non-limiting method outlined in FIG. 2.

Node A, which receives a message from another nod; first attempts (block 10) to identify the message as one originating from a node which is accepted by node A, for example the AODV protocol. If the message which is received is from a "foreign" protocol, the message is simply discarded (block 80).

If, however, the message is from an "accepted" protocol, node A will see if the sending node is one which is already present in the routing table maintained by node A (block 20). If this is so, the signal level, SNR, of the received signal, will be tested against a first threshold level, (block 40). If the SNR of the signal falls below this level, the message is discarded or ignored, (block 80). If, however, the SNR of the of the received signal exceeds or is equal to the first threshold level, the sending node is maintained in the routing table of node A.

Reverting now to block 20, if the sending node is not one which is present in the routing table maintained by node A, the message is considered to originate from a node which is "new" to the routing table of node A. The SNR of the message is then tested against a second threshold level, which is higher than the first threshold level used for messages from "existing" nodes.

If the message from the "new" node has an SNR which does not exceed or is equal to the second threshold level, the message is discarded (block 80). If, however, the message's SNR does exceed the second threshold level, the node is added to the routing table maintained by node A.

Thus, the second threshold used for unknown nodes helps to define a predetermined quality of existing links, and effectively differentiates between "good" and "bad" neighbours, i.e. between good and bad quality links. If the link quality of the link to a potential neighbour (either previously unknown to the node or a multi-hop connection to this node already exists) is above the defined threshold, that node becomes a new neighbour.

Additionally, since, due to the wireless nature of the link, the SNR can vary even if nodes are not moving. The first threshold level used for existing nodes defines a margin for the SNR that allows SNR variations to a certain extent. This minimises the probability that nodes will oscillate between neighbours and non-neighbours, which increases the stability of the network. Thus, once a route is established, it will not be lost because of one weak signal.

For the threshold values, a level of 10 dB for the first threshold value, and a level of 15 dB for the second threshold value are values which have given good results. Naturally, these values can be varied freely, and are only mentioned as non-limiting examples of values which have proven useful.

The invention is not limited to the embodiment described above, but can be varied freely within the scope of the appended claims.

The invention claimed is:

1. A method for use by a first node in an ad-hoc Wireless Local Area Network (WLAN) which first node maintains a table of other nodes within the network which can be used for forwarding messages within the network, said method comprising:

receiving a first signal from a second node, analyzing the first signal to determine its signal-to-noise ratio (SNR), determining if the second node is a member of a good neighbor group of nodes having net a predetermined signal-to-noise ratio (SNR) requirement and is already listed in the table maintained by the first node, if the second node is a member of the good neighbor group of nodes already listed in the table maintained by the first node, comparing the signal-to-noise ratio (SNR) of the first signal to a first predetermined signal-to-noise ratio (SNR) threshold, if the signal-to-noise ratio (SNR) of the first signal exceeds the first predetermined signal-to-noise ratio (SNR) threshold, maintaining the second node in the table as a member of the good neighbor group of nodes, and if the signal-to-noise ratio (SNR) of the first signal does not exceed the first predetermined signal-to-noise ratio (SNR) threshold, discarding the first signal, and if the second node is not a member of the good neighbor group of nodes already listed in the table maintained by the first node, comparing the signal-to-noise ratio (SNR) of the first signal to a second predetermined signal-to-noise ratio (SNR) threshold greater than the first predetermined signal-to-noise ratio (SNR) threshold, if the signal-to-noise ratio (SNR) of the first signal exceeds the second predetermined signal-to-noise ratio (SNR) threshold, adding the second node to the table so that the second node is included as a new member in the good neighbor group of nodes, and if the signal-to-noise ratio (SNR) of the first signal does not exceed the second predetermined signal-to-noise ratio (SNR) threshold, discarding the first signal and continuing to not list the second node in the table, wherein said method is applied in an AODV or DSR system.

2. The method of claim 1, applied in a system that complies with an IEEE 802.11 standard.

3. A first node in an ad-hoc Wireless Local Area Network (WLAN) configured to:

maintain a table of other nodes within the network that are members of a good neighbor group of nodes having met a predetermined signal-to-noise ratio (SNR) requirement and which can be used for forwarding messages within the network, receive a first signal from a second node, analyze the first signal to determine its signal-to-noise ratio (SNR), compare the signal-to-noise ratio (SNR) to a first predetermined signal-to-noise ratio (SNR) threshold if the second node is a member of the good neighbor group of nodes and already listed in the table maintained by the first node and maintain the second node in the table in the good neighbor group of nodes if the signal-to-noise ratio (SNR) exceeds the first predetermined signal-to-noise ratio (SNR) threshold, and compare the signal-to-noise ratio (SNR) to a second predetermined signal-to-noise ratio (SNR) threshold if the second node is not listed in the table and add the second node to the table if the signal-to-noise ratio (SNR) exceeds the second predetermined signal-to-noise ratio (SNR) threshold so that the second node is included as a new member in the good neighbor group of nodes, wherein the second predetermined signal-to-noise ratio (SNR) threshold is greater than the first predetermined signal-to-noise ratio (SNR) threshold, wherein said node is configured to be applied in an AODV or DSR system.

4. The node of claim 3, applied in a system that complies with an IEEE 802.11 standard.

* * * * *

UNITED STATES PATENT AND TRADEMARK OFFICE
CERTIFICATE OF CORRECTION

PATENT NO. : 7,831,206 B2
APPLICATION NO. : 10/528776
DATED : November 9, 2010
INVENTOR(S) : Dupcinov et al.

It is certified that error appears in the above-identified patent and that said Letters Patent is hereby corrected as shown below:

On the Face Page, in Field (73), under "Assignee", in Column 1, Line 2, delete "Stockkolm" and insert -- Stockholm --, therefor.

In Fig. 1, Sheet 1 of 2, delete "Fig 1" and insert -- Fig. 1 --, therefor.

Figure 2:
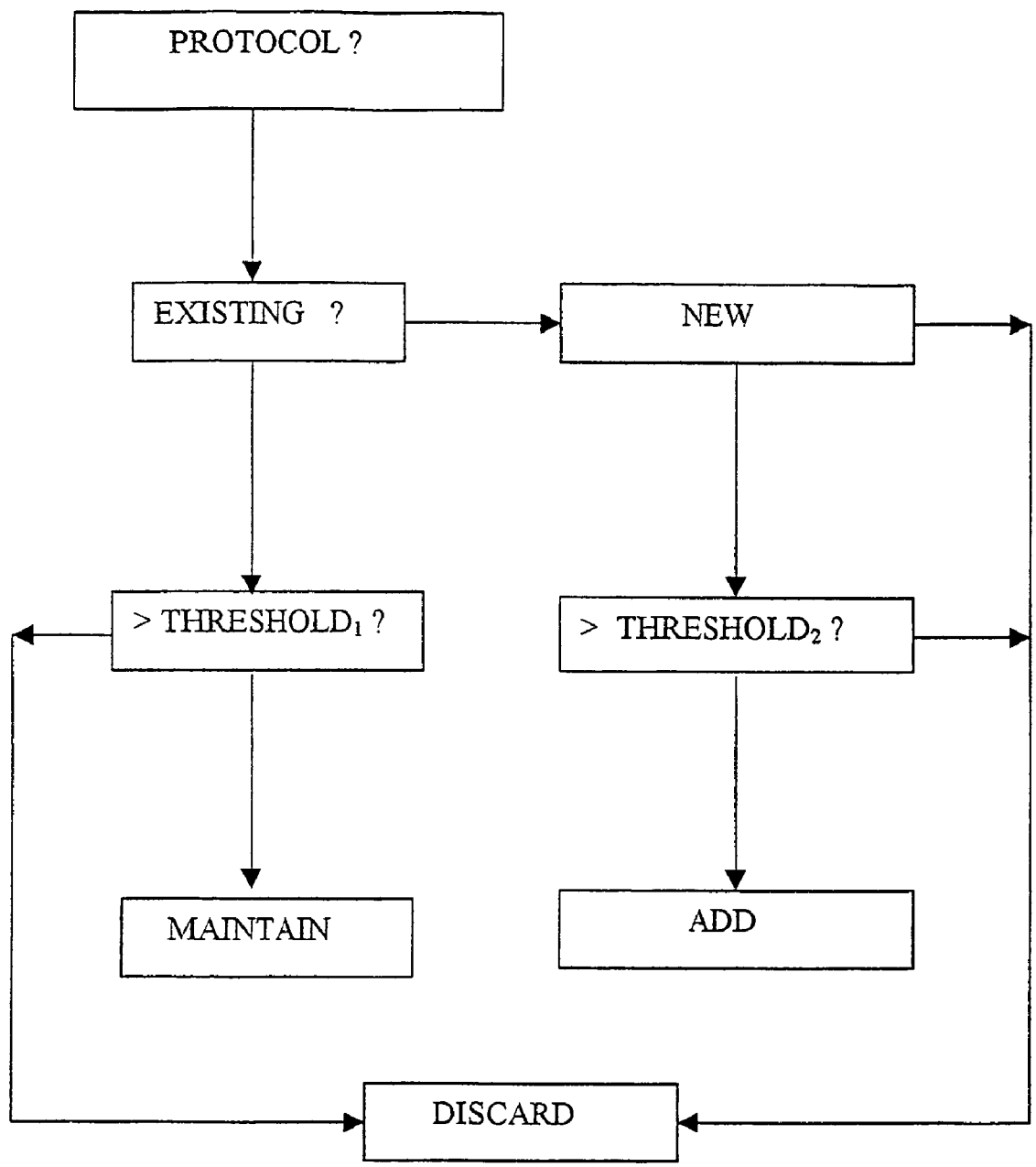
FIG. 2 shows a flowchart used by a node in an ad-hoc WLAN-system.

In Fig. 1, Sheet 2 of 2, delete "Fig 2" and insert -- Fig. 2 --, therefor.

In Column 1, Line 6, delete "PCT/SE2002/00197 and insert -- PCT/SE2002/01977 --, therefor.

In Column 2, Lines 27-38, delete "If the second..........................known technology.".

In Column 3, Line 60, delete "nod;" and insert -- node; --, therefor.

In Column 4, Line 54, in Claim 1, delete "net" and insert -- met --, therefor.

Signed and Sealed this
Nineteenth Day of July, 2011

David J. Kappos
*Director of the United States Patent and Trademark Office*